US012565855B1

(12) United States Patent
Miller et al.

(10) Patent No.: US 12,565,855 B1
(45) Date of Patent: Mar. 3, 2026

(54) GAS TURBINE ENGINE

(71) Applicant: General Electric Company, Evendale, OH (US)

(72) Inventors: Brandon Wayne Miller, Middletown, OH (US); Arthur William Sibbach, Boxford, MA (US); Daniel Alan Niergarth, Norwood, OH (US); Darek Tomasz Zatorski, Fort Wright, KY (US); Nicholas Joseph Kray, Mason, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/054,026

(22) Filed: Feb. 14, 2025

(51) Int. Cl.
F02C 7/04 (2006.01)
F04D 29/36 (2006.01)

(52) U.S. Cl.
CPC .............. F02C 7/04 (2013.01); F04D 29/362 (2013.01)

(58) Field of Classification Search
CPC ................................. F02C 7/04; F04D 29/362
See application file for complete search history.

(56) References Cited

U.S. PATENT DOCUMENTS

| | | | |
|---|---|---|---|
| 3,873,236 A | 3/1975 | Gall | |
| 4,704,862 A | 11/1987 | Dennison et al. | |
| 4,738,591 A | 4/1988 | Butler | |
| 4,762,466 A | 8/1988 | Bouiller et al. | |
| 4,976,102 A | 12/1990 | Taylor | |

| | | | |
|---|---|---|---|
| 5,022,825 A | 6/1991 | Violette et al. | |
| 6,071,076 A | 6/2000 | Ansari et al. | |
| 6,739,120 B2 | 5/2004 | Moniz et al. | |
| 6,763,653 B2 | 7/2004 | Orlando et al. | |
| 7,296,969 B2 | 11/2007 | Raes et al. | |
| 7,422,419 B2 | 9/2008 | Carvalho | |
| 7,976,279 B2 | 7/2011 | Raes et al. | |
| 8,133,027 B2 | 3/2012 | Carvalho et al. | |
| 8,198,744 B2 | 6/2012 | Kern et al. | |
| 8,439,640 B2 | 5/2013 | Arel et al. | |
| 8,753,084 B2 | 6/2014 | Morgan | |
| 9,127,566 B2 * | 9/2015 | Suciu ........................ F01D 9/02 |
| 10,221,706 B2 | 3/2019 | Niergarth et al. | |
| 10,794,288 B2 | 10/2020 | Schwarz et al. | |
| 11,066,958 B2 | 7/2021 | Karafillis et al. | |
| 11,085,310 B2 | 8/2021 | Niergarth et al. | |
| 11,098,646 B2 * | 8/2021 | Macchia ................. F02C 7/047 |

(Continued)

FOREIGN PATENT DOCUMENTS

| | | |
|---|---|---|
| CN | 112937837 A | 6/2021 |
| CN | 116927976 A | 10/2023 |
| FR | 2992678 A1 | 1/2014 |

OTHER PUBLICATIONS

Co-Pending U.S. Appl. No. 18/794,384, filed Aug. 5, 2024.

*Primary Examiner* — Sabbir Hasan
(74) *Attorney, Agent, or Firm* — Dority & Manning, P.A.

(57) ABSTRACT

A gas turbine engine defining an axial direction and a radial direction includes a spinner defining a spinner duct and a spinner inlet to the spinner duct, a turbomachine comprising a compressor section, a combustion section, and a turbine section arranged in serial flow order, the turbomachine defining a fan duct, a fan duct inlet to the fan duct, a core duct, and a core inlet to the core duct, and a primary fan driven by the turbomachine, wherein the spinner inlet is upstream of the primary fan.

7 Claims, 12 Drawing Sheets

(56) References Cited

U.S. PATENT DOCUMENTS

| | | | |
|---|---|---|---|
| 11,859,516 B2 | 1/2024 | Ostdiek | |
| 12,044,194 B2 | 7/2024 | Ostdiek et al. | |
| 12,055,153 B1 * | 8/2024 | Chakrabarti | F04D 29/668 |
| 2018/0340447 A1 | 11/2018 | Karafillis et al. | |
| 2022/0252008 A1 | 8/2022 | Sibbach et al. | |
| 2023/0013057 A1 | 1/2023 | Millier et al. | |
| 2023/0250755 A1 | 8/2023 | Sibbach et al. | |

* cited by examiner

GAS TURBINE ENGINE

FIELD

The present disclosure relates to a gas turbine engine with components to increase air flow into a turbomachine.

BACKGROUND

A gas turbine engine typically includes a fan and a turbomachine. The turbomachine generally includes an inlet, one or more compressors, a combustor, and at least one turbine. The compressors compress air which is channeled to the combustor where it is mixed with fuel. The mixture is then ignited for generating hot combustion gases. The combustion gases are channeled to the turbines which extract energy from the combustion gases for powering the compressors, as well as for producing useful work to propel an aircraft in flight. The turbomachine is mechanically coupled to the fan for driving the fan during operation.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
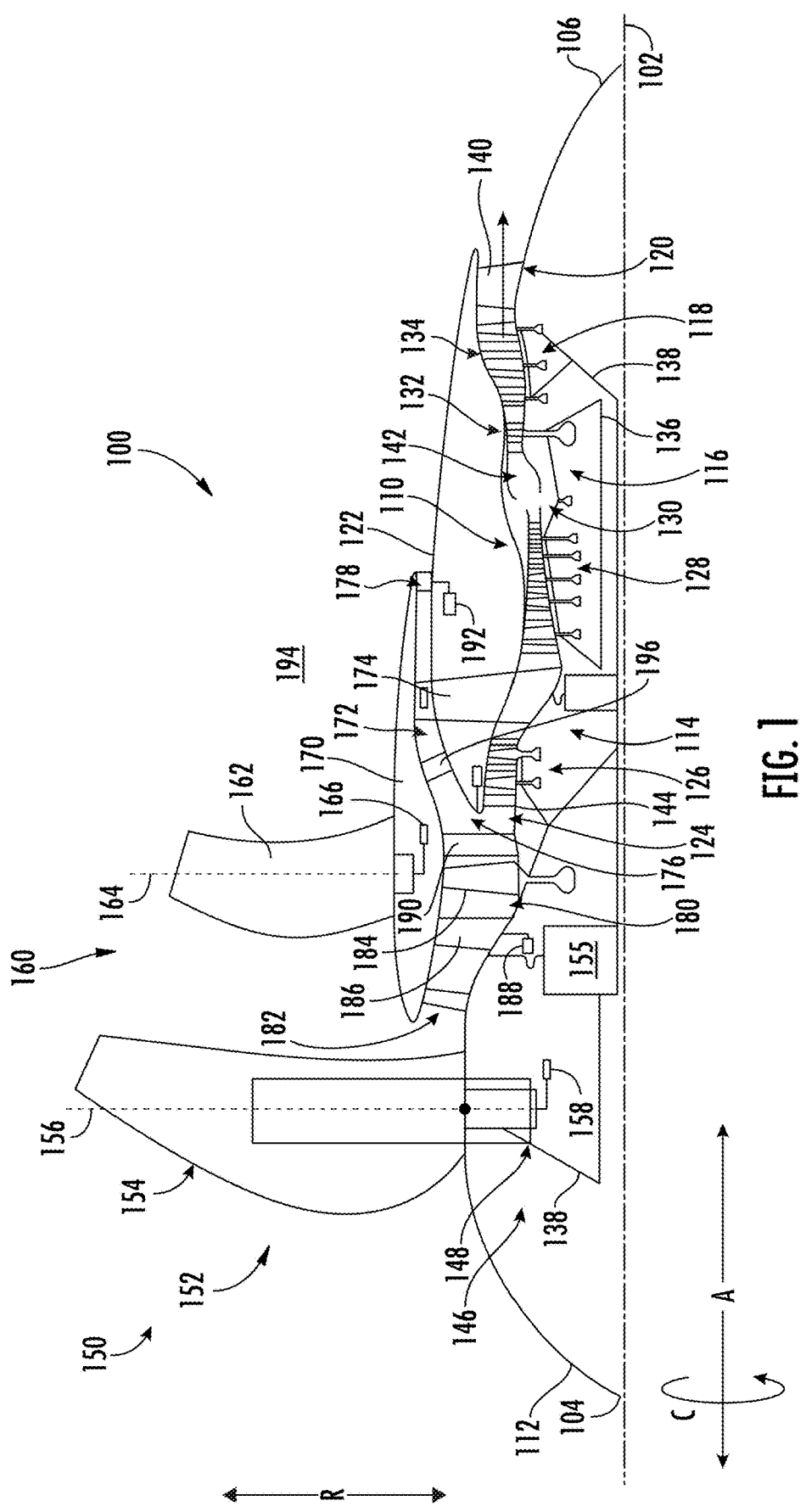
FIG. 1 is a schematic view of a gas turbine engine.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The terms "upstream" and "downstream" refer to the relative direction with respect to fluid flow in a fluid pathway. For example, "upstream" refers to the direction from which fluid flows, and "downstream" refers to the direction to which the fluid flows.

The terms "forward" and "aft" refer to relative positions within a gas turbine engine or vehicle, and are based on a normal operational attitude of the gas turbine engine or vehicle. More particularly, forward and aft are used herein with reference to a direction of travel of the vehicle and a direction of propulsive thrust of the gas turbine engine.

The present disclosure is generally related to increasing air flow into a turbomachine of a gas turbine engine. In an open fan architecture, inlet losses may occur due to the large size of a spinner of the turbomachine. The inlet losses may reduce ram inlet recovery, increasing fuel consumption.

By incorporating one or more components to increase air flow into a core duct of the turbomachine, the inlet losses may be reduced or eliminated. In particular, a rotating inlet frame with fan-shaped struts can direct air flowing across the spinner into an engine inlet, increasing flow into the core duct. Additionally, a spinner inlet defined in the spinner itself can further increase air flow that would otherwise flow into a bypass passage. An additional booster can further increase air flow into the core duct. With the inlet frame, the booster, and spinner inlet, other components are rearranged within the turbomachine, such as a fan pitch actuation system, to control other components while maintaining the increased air flow.

Referring now to the drawings, wherein identical numerals indicate the same elements throughout the figures, FIG. 1 is a schematic cross-sectional view of a gas turbine engine 100 in accordance with an embodiment of the present disclosure. Particularly, FIG. 1 provides a gas turbine engine having a rotor assembly with a single stage of unducted rotor blades. In such a manner, the rotor assembly may be referred to herein as an "unducted fan," or the entire engine 100 may be referred to as an open rotor engine. In addition, the engine 100 of FIG. 1 includes a third stream extending from the compressor section to a rotor assembly flow path over the turbomachine, as will be explained in more detail below.

For reference, the engine 100 defines an axial direction A, a radial direction R, and a circumferential direction C. Moreover, the engine 100 defines an axial centerline 102 that extends along the axial direction A. In general, the axial direction A extends parallel to the axial centerline 102, the radial direction R extends outward from and inward to the axial centerline 102 in a direction orthogonal to the axial direction A, and the circumferential direction extends three hundred sixty degrees) (360°) around the axial centerline 102. The engine 100 extends between a forward end 104 and an aft end 106, e.g., along the axial direction A.

The engine 100 includes a fan section 150, a turbomachine 110, and a spinner 112. Generally, the turbomachine 110 includes, in serial flow order, a compressor section 114, a combustion section 116, a turbine section 118, and an exhaust section 120. Particularly, as shown in FIG. 1, the turbomachine 110 includes a core cowl 122 that defines an annular core inlet 124. The core cowl 122 further encloses at least in part a low pressure system and a high pressure system. For example, the core cowl 122 depicted encloses and supports at least in part a booster or low pressure ("LP") compressor 126 of the compressor section 114 for pressurizing the air that enters the turbomachine 110 through core inlet 124. A high pressure ("HP"), multi-stage, axial-flow compressor 128 of the compressor section 114 receives pressurized air from the LP compressor 126 and further increases the pressure of the air. The pressurized air stream flows downstream to a combustor 130 of the combustion section 116 where fuel is injected into the pressurized air stream and ignited to raise the temperature and energy level of the pressurized air.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems and are not meant to imply any absolute speed or pressure values.

The high energy combustion products flow from the combustor 130 downstream to an HP turbine 132 of the turbine section 118. The HP turbine 132 drives the HP compressor 128 through a high pressure shaft 136. In this regard, the HP turbine 132 is drivingly coupled with the HP compressor 128. The high energy combustion products then flow to an LP turbine 134 of the turbine section 118. The LP turbine 134 drives the LP compressor 126 and components of the fan section 150 through an LP shaft 138. In this regard, the LP turbine 134 is drivingly coupled with the LP compressor 126 and components of the fan section 150. The LP shaft 138 is coaxial with the HP shaft 136 in this example embodiment. After driving each of the HP and LP turbines 132, 134, the combustion products exit the turbomachine 110 through a turbomachine exhaust nozzle 140 of the exhaust section 120.

Accordingly, the turbomachine 110 defines a working gas flow path or core duct 142 that extends between the core inlet 124 and the turbomachine exhaust nozzle 140. The core duct 142 is an annular duct positioned generally inward of the core cowl 122 along the radial direction R.

The fan section 150 includes a fan 152, which is the primary fan in this example embodiment. For the depicted embodiment of FIG. 1, the fan 152 is an open rotor or unducted fan 152. In such a manner, the engine 100 may be referred to as an open rotor engine.

As depicted, the fan 152 includes an array of fan blades 154 (only one shown in FIG. 1). The fan blades 154 are rotatable, e.g., about the axial centerline 102. As noted above, the fan 152 and the spinner 112 are drivingly coupled with the LP turbine 134 via the LP shaft 138. For the embodiments shown in FIG. 1, the fan 152 is coupled with the LP shaft 138 via a gearbox 155 that is a speed reduction gearbox, e.g., in an indirect-drive or geared-drive configuration.

It will be appreciated that the fan blades 154 may be configured to be composite fan blades, e.g., formed in whole or in part of a composite material. The term composite material as used herein may be defined as a material containing a reinforcement such as fibers or particles supported in a binder or matrix material. Composites include metallic and non-metallic composites.

Moreover, the array of fan blades 154 can be arranged in equal spacing around the axial centerline 102. Each fan blade 154 has a root and a tip and a span defined therebetween. Each fan blade 154 defines a central blade axis 156. For this embodiment, each fan blade 154 of the fan 152 is rotatable about its central blade axis 156, e.g., in unison with one another. One or more actuators 158 are provided to facilitate such rotation and therefore may be used to change a pitch of the fan blades 154 about their respective central blades' axes 156.

As depicted, it will be appreciated that the fan section 150 includes a variable pitch fan assembly 146 and a disk 148 having a plurality of disk segments arranged in a spaced apart manner. The variable pitch fan assembly 146 is coupled to the disk 148, comprising a trunnion coupled to the disk 148 and the fan blade 154. The disk 148 has a generally annular shape about the axial direction A. Further, the fan blades 154 extend outwardly from the disk 148 generally along the radial direction R. Each fan blade 154 is also rotatable relative to the disk 148 about the central blade axis 156 by virtue of the fan blades 154 being operatively coupled to the actuator(s) 158 configured to collectively vary the pitch of the fan blades 154, e.g., in unison.

The fan section 150 further includes a fan guide vane array 160 that includes fan guide vanes 162 (only one shown in FIG. 1) disposed around the axial centerline 102. For this embodiment, the fan guide vanes 162 are not rotatable about the axial centerline 102. Each fan guide vane 162 has a root and a tip and a span defined therebetween. The fan guide vanes 162 may be unshrouded, as shown in FIG. 1 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about its respective central blade axis 164, e.g., in unison with one another. One or more actuators 158 are provided to facilitate such rotation and, therefore, may be used to change a pitch of the fan guide vane 162 about its respective central blade axis 164. However, in other embodiments, each fan guide vane 162 may be fixed or unable to be pitched about its central blade axis 164. The fan guide vanes 162 are mounted to a fan cowl 170.

As shown in FIG. 1, in addition to the fan 152, which is unducted, a ducted fan 184 is included aft of the fan 152, such that the engine 100 includes both a ducted and an unducted fan which both serve to generate thrust through the movement of air without passage through at least a portion of the turbomachine 110 (e.g., without passage through the HP compressor 128 and combustion section 116 for the embodiment depicted). The ducted fan 184 is rotatable about the same axis (e.g., the axial centerline 102) as the fan blade 154. The ducted fan 184 is, for the embodiment depicted, driven by the low pressure turbine 134 (e.g., coupled to the LP shaft 138). In the embodiment depicted, as noted above, the fan 152 may be referred to as the primary fan, and the ducted fan 184 may be referred to as a secondary fan. It will be appreciated that these terms "primary" and "secondary" are terms of convenience, and do not imply any particular importance, power, or the like.

The ducted fan 184 includes a plurality of fan blades (not separately labeled in FIG. 1) arranged in a single stage, such that the ducted fan 184 may be referred to as a single stage fan. The fan blades of the ducted fan 184 can be arranged in equal spacing around the axial centerline 102. Each blade of the ducted fan 184 has a root and a tip and a span defined therebetween.

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define
a fan duct flow path, or simply a fan duct 172. According to
this embodiment, the fan flow path or fan duct 172 may be
understood as forming at least a portion of the third stream
of the engine 100.

Incoming air may enter through the fan duct 172, through
a fan duct inlet 176, and may exit through a fan exhaust
nozzle 178 to produce propulsive thrust. The fan duct 172 is
an annular duct positioned generally outward of the core
duct 142 along the radial direction R. The fan cowl 170 and
the core cowl 122 are connected together and supported by
a plurality of substantially radially extending, circumferen-
tially spaced stationary struts 174 (only one shown in FIG.
1). The stationary struts 174 may each be aerodynamically
contoured to direct air flowing thereby. Other struts in
addition to the stationary struts 174 may be used to connect
and support the fan cowl 170 or core cowl 122. In many
embodiments, the fan duct 172 and the core duct 142 may
at least partially co-extend (generally axially) on opposite
sides (e.g., opposite radial sides) of the core cowl 122. For
example, the fan duct 172 and the core duct 142 may each
extend directly from a leading edge 144 of the core cowl 122
and may partially co-extend generally axially on opposite
radial sides of the core cowl 122.

The engine 100 also defines or includes an inlet duct 180.
The inlet duct 180 extends between an engine inlet 182 and
the core inlet 124/fan duct inlet 176. The engine inlet 182 is
defined generally at the forward end of the fan cowl 170 and
is positioned between the fan 152 and the fan guide vane
array 160 along the axial direction A. The inlet duct 180 is
an annular duct that is positioned inward of the fan cowl 170
along the radial direction R. Air flowing downstream along
the inlet duct 180 is split, not necessarily evenly, into the
core duct 142 and the fan duct 172 by a fan duct splitter or
leading edge 44 of the core cowl 122. In the embodiment
depicted, the inlet duct 180 is wider than the core duct 142
along the radial direction R. The inlet duct 180 is also wider
than the fan duct 172 along the radial direction R.

Notably, for the embodiment depicted, the engine 100
further includes an array of inlet guide vanes 186 positioned
in the inlet duct 180 upstream of the ducted fan 184 and
downstream of the engine inlet 182. The array of inlet guide
vanes 186 are arranged around the axial centerline 102. For
this embodiment, the inlet guide vanes 186 are not rotatable
about the axial centerline 102. Each inlet guide vane 186
defines a central blade axis (not labeled for clarity), and is
rotatable about its respective central blade axis, e.g., in
unison with one another. In such a manner, the inlet guide
vanes 186 may be considered a variable geometry compo-
nent. One or more actuators 158 are provided to facilitate
such rotation and therefore may be used to change a pitch of
the inlet guide vanes 186 about their respective central blade
axes. However, in other embodiments, each inlet guide
vanes 186 may be fixed or unable to be pitched about its
central blade axis.

Further, located downstream of the ducted fan 184 and
upstream of the fan duct inlet 176, the engine 100 includes
an array of outlet guide vanes (OGVs) 190. As with the array
of inlet guide vanes 186, the array of outlet guide vanes 190
are not rotatable about the axial centerline 102. However, for
the embodiment depicted, unlike the array of inlet guide
vanes 186, the array of outlet guide vanes 190 are configured
as fixed-pitch outlet guide vanes.

Further, it will be appreciated that for the embodiment
depicted, the fan exhaust nozzle 178 of the fan duct 172 is
further configured as a variable geometry exhaust nozzle. In
such a manner, the engine 100 includes one or more actuators 158 for modulating the variable geometry exhaust
nozzle. For example, the variable geometry exhaust nozzle
may be configured to vary a total cross-sectional area (e.g.,
an area of the nozzle in a plane perpendicular to the axial
centerline 102) to modulate an amount of thrust generated
based on one or more engine operating conditions (e.g.,
temperature, pressure, mass flowrate, etc. of an airflow
through the fan duct 172). A fixed geometry exhaust nozzle
may also be adopted.

The gas turbine engine 100, as noted above includes a
primary fan, or rather the fan 152 having fan blades 154, and
a secondary fan, or rather the ducted fan 184 having fan
blades 185. Airflow from the fan 152 is split between a
bypass passage 194 and the inlet duct 180 by an inlet splitter.
Airflow from the ducted fan 184 is split between the fan duct
172 and the core duct 142 by the leading edge 144 (some-
times also referred to as a fan duct splitter). The gas turbine
engine 100 in such a form defines a "first" stream through
the bypass passage 194, a "second" stream through the core
duct 142, and a "third" stream through the fan duct 172.

Moreover, referring still to FIG. 1, in exemplary embodi-
ments, air passing through the fan duct 172 may be relatively
cooler (e.g., lower temperature) than one or more fluids
utilized in the turbomachine 110. In this way, one or more
heat exchangers 196 may be positioned in thermal commu-
nication with the fan duct 172. For example, one or more
heat exchangers 196 may be disposed within the fan duct
172 and utilized to cool one or more fluids from the core
engine with the air passing through the fan duct 172, as a
resource for removing heat from a fluid, e.g., compressor
bleed air, oil, or fuel.

Although not depicted, the heat exchanger 196 may be an
annular heat exchanger extending substantially 360 degrees
in the fan duct 172 (e.g., at least 300 degrees, such as at least
330 degrees). In such a manner, the heat exchanger 196 may
effectively utilize the air passing through the fan duct 172 to
cool one or more systems of the engine 100 (e.g., lubrication
oil systems, compressor bleed air, electrical components,
etc.). The heat exchanger 196 uses the air passing through
the fan duct 172 as a heat sink and correspondingly increases
the temperature of the air downstream of the heat exchanger
196 exiting the fan exhaust nozzle 178.

It should be appreciated that the engine 100 depicted in
FIG. 1 and described herein is by way of example only, and
that embodiments of the present disclosure may be incor-
porated in other gas turbine engines as well (such as a ducted
turbofan engine).

It will be appreciated, however, that the exemplary engine
100 is provided by way of example only. In other exemplary
embodiments, the engine 100 may have any other configu-
ration. For example, in other exemplary embodiments, the
turbomachine 110 may have any other number and arrange-
ment of shafts, spools, compressors, turbines, etc. Further, in
other exemplary embodiments, the engine 100 may alterna-
tively be configured as a ducted turbofan engine (including
an outer nacelle surrounding the fan 152 and a portion of the
turbomachine 110); as a direct drive gas turbine engine (may
not include a reduction gearbox, such as gearbox 155); as a
two-stream gas turbine engine (may not include the fan duct
172); etc.

Figure 2:
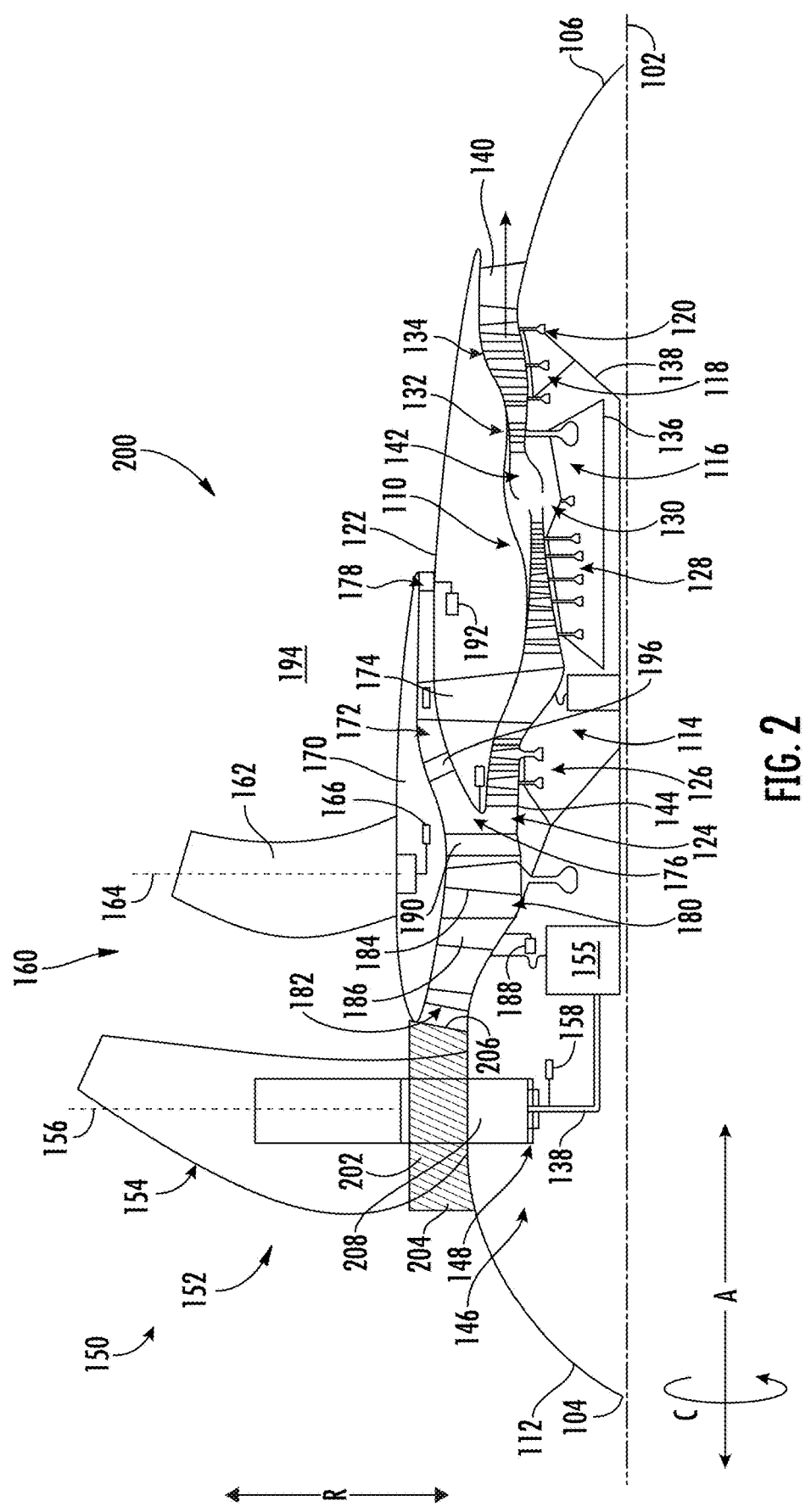
FIG. 2 is a schematic view of a gas turbine engine with an inlet frame.
Figure 3:
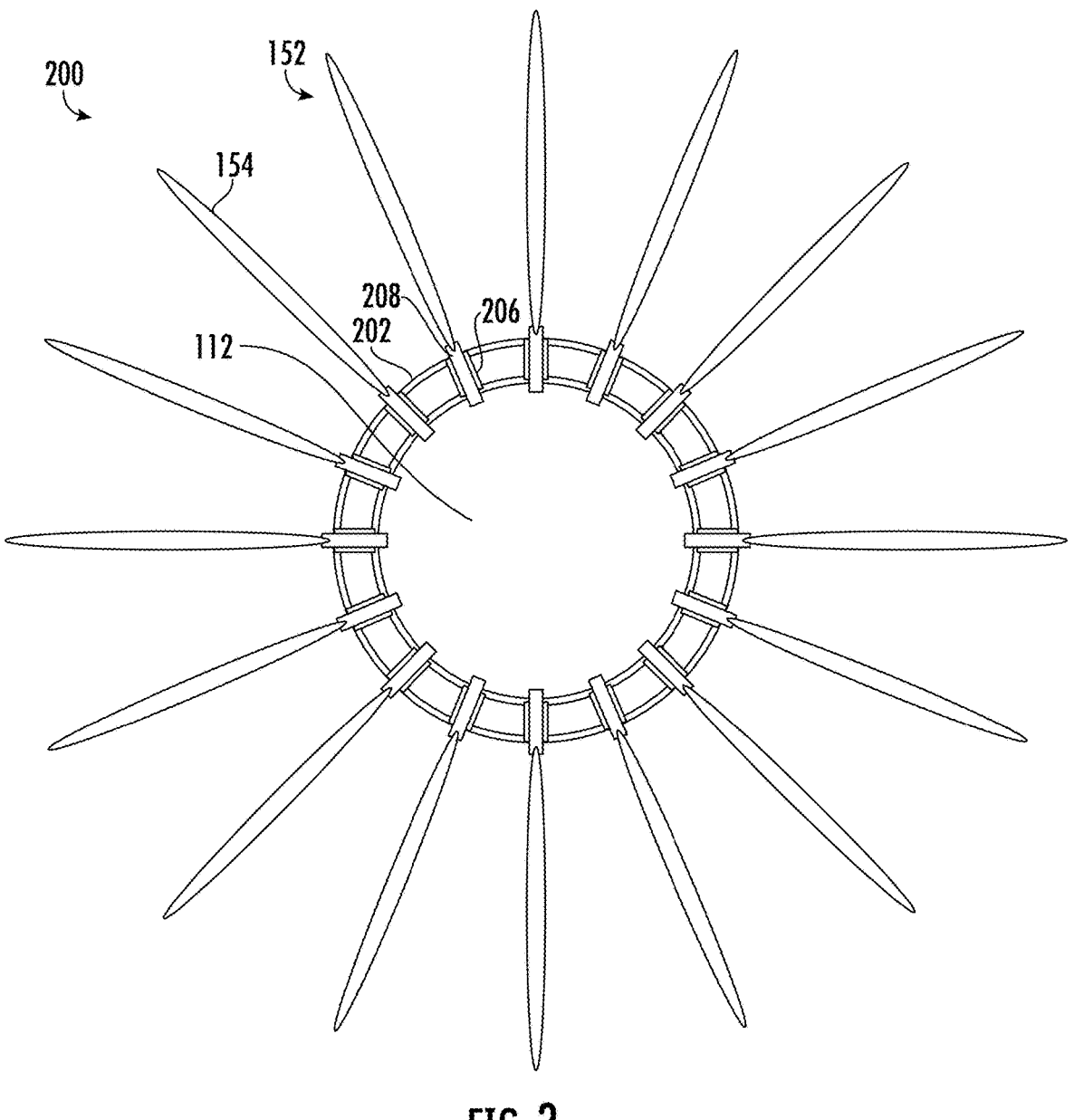
FIG. 3 is an aft view of the gas turbine engine of FIG. 2.

Now referring to FIGS. 2-3, another gas turbine engine
200 is shown. FIG. 2 is a schematic view of the gas turbine
engine 200. FIG. 3 is an aft view of the gas turbine engine
200. It will be appreciated that parts that are similar to the
gas turbine engine of FIG. 1 will share a common numeral.

The gas turbine engine 200 includes an inlet frame 202.
The inlet frame 202 directs air into the engine inlet 182. In particular, the inlet frame 202 has a forward end 204 disposed upstream of the engine inlet 182 and an aft end 206 disposed adjacent to the engine inlet 182. The inlet frame 202 is disposed between the spinner 112 and the primary fan 152, directing air flow at a specific radial position into the engine inlet 182. In the example of FIGS. 2-3, the inlet frame 202 is a separate component from the spinner 112, and it will be appreciated that the inlet frame 202 may be integrated with the spinner 112.

The inlet frame 202 includes a plurality of struts 208 (FIG. 3) extending from the spinner 112 to the primary fan 152. As described in further detail below, the struts 208 direct air into the engine inlet 182. Specifically, the plurality of struts 208 are disposed upstream of the engine inlet 182 and are shaped to guide air flowing in the axial direction A into the engine inlet 182.

The gas turbine engine 200 includes a plurality of trunnions 210 disposed in the spinner 112. The trunnions 210 extend in the radial direction from the disk 148 and through the spinner 112 to the fan blades 154 of the primary fan 152. Specifically, each of the plurality of trunnions 210 extends from the spinner 112 through one of the plurality of struts 208 to one of the plurality of fan blades. The trunnions 210 support the fan blades on the spinner 112 to provide variable pitch to the primary fan. The trunnions 210 are part of a fan pitch actuation system (which is part of the variable pitch fan assembly 146), described in further detail below, which rotates each of the fan blades 154 to a specified pitch angle. In particular, each trunnion 210 is fixed to one of the fan blades 154 such that rotation of the trunnion 210 causes rotation of the fan blade 154, changing the pitch angle of the fan blade 154. Varying the pitch of the fan blades 154 provides specified air flow and thrust for the gas turbine engine 200.

Figure 4:
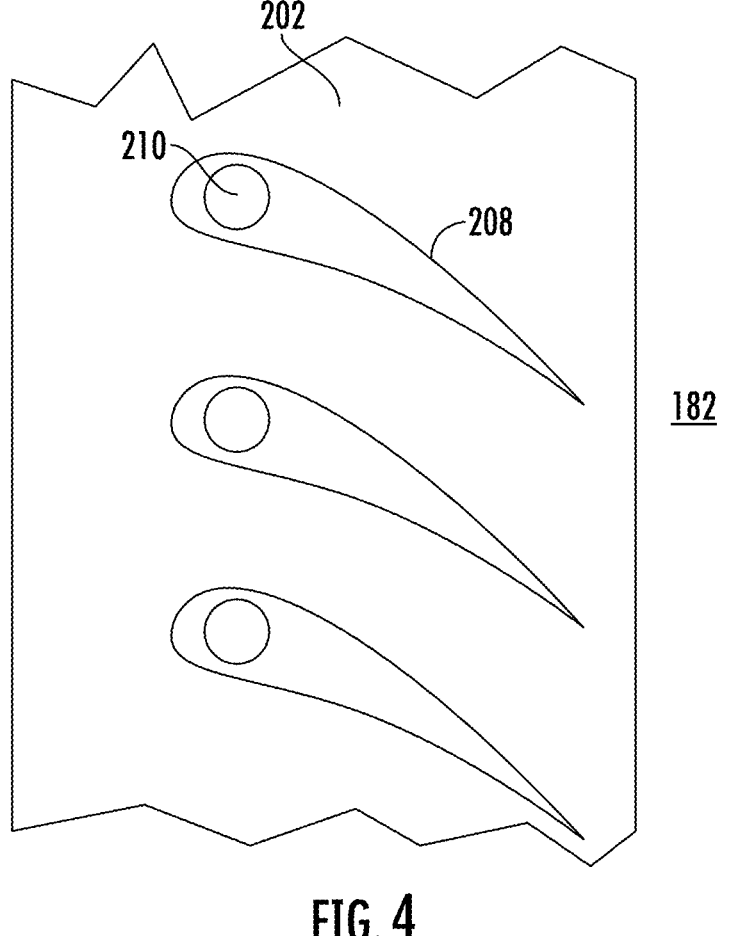
FIG. 4 is a magnified cross-sectional view of the inlet frame of FIG. 2.

With reference to FIG. 4, a top-down cross-sectional view of the inlet frame 202 is provided. In particular, the inlet frame 202 includes the plurality of struts 208 and one of the trunnions 210 extending through each of the plurality of struts 208. Each of the plurality of struts 208 has an airfoil shape positioned to direct air into the engine inlet 182. The plurality of struts 208 are fixed in the inlet frame 202, and the airfoil shape is determined to provide a specified air flow into the engine inlet 182. In particular, the airfoil shape may extend in an opposing direction to the pitch of the fan blades, which increases capture of air flow swirled by the fan blades. Alternatively, the airfoil shape extends in a same direction to the pitch of the fan blades. In FIG. 4, each of the plurality of struts 208 includes one of the trunnions 210, and the trunnions 210 rotate freely within the struts 208.

Figure 5:
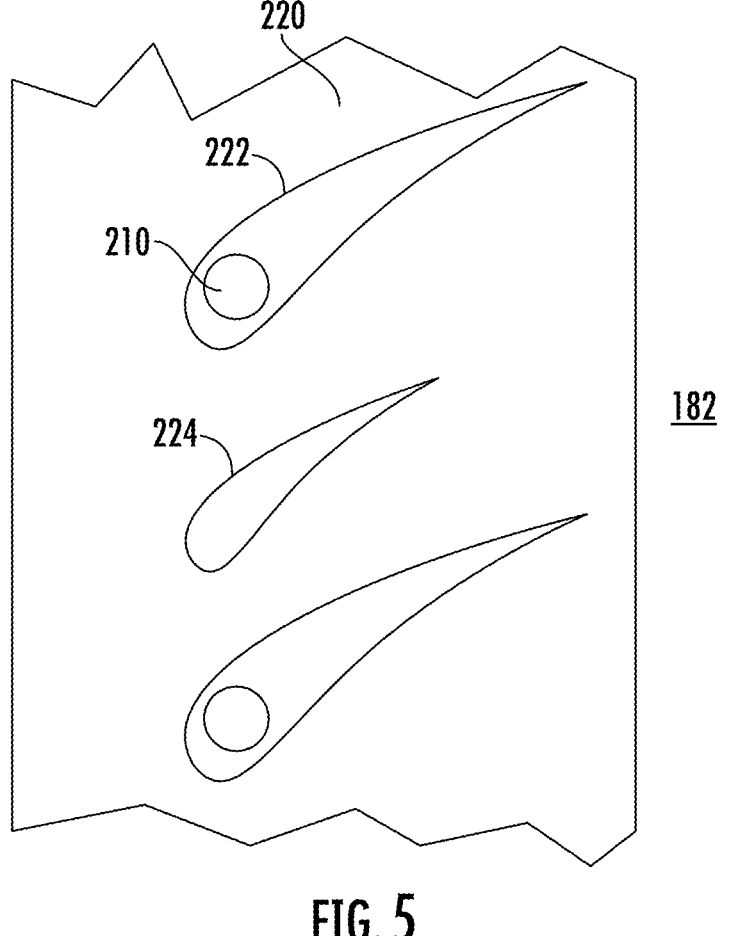
FIG. 5 is a magnified cross-sectional view of another inlet frame.

Now referring to FIG. 5, a top-down cross-sectional view of another inlet frame 220 is provided. The inlet frame 220 includes a plurality of struts, and the plurality of struts include a plurality of first struts 222 each having a first shape and a plurality of second struts 224 each having a second shape. The first shape is different than the second shape to provide specific air flow into the engine inlet 182. In FIG. 5, each of the plurality of second struts 224 is disposed between an adjacent two of the plurality of first struts 222. Additionally, each of the first struts 222 includes one of the plurality of trunnions 210 extending to one of the fan blades 154 (FIG. 3). In such a form, the first shape is determined to allow the trunnions 210 to extend through the first struts 222, and the second shape is determined to fit between the first struts 222 in the circumferential direction C. Specifically, the first shape is an airfoil shape, and the second shape is a smaller airfoil shape. The airfoil shapes may be pitched in an opposite direction to the pitch angles of the fan blades 154

(FIG. 3), which improves air flow into the engine inlet 182 by capturing air in a swirl upstream of the fan blades 154 (FIG. 3).

Figure 6:
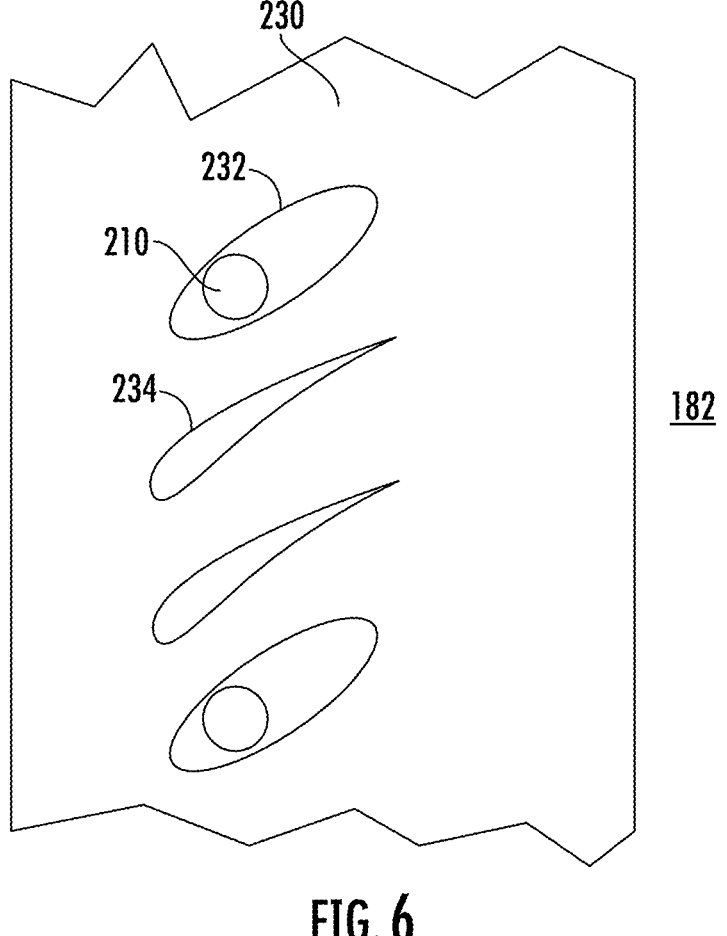
FIG. 6 is a magnified cross-sectional view of another inlet frame.

Now referring to FIG. 6, a top-down cross-sectional view of another inlet frame 230 is provided. The inlet frame includes a plurality of struts, and the plurality of struts include a plurality of first struts 232 each having a first shape and a plurality of second struts 234 each having a second shape. In this form, the first shape is an elliptical shape, and the second shape is an airfoil shape. The elliptical shape of the first struts 232 directs air flow toward the second struts 234, and the airfoil shape of the second struts 234 directs air flow into the engine inlet 182. More than one of the second struts 234 may be disposed between adjacent ones of the first struts 232 in the circumferential direction C, such as the two second struts 234 shown in FIG. 6. Each first strut 232 includes one trunnion 210 extending therethrough to one of the fan blades 154 (FIG. 3). As another example, not shown in the FIGS., the second struts 234 may have an elliptical shape.

Figure 7:
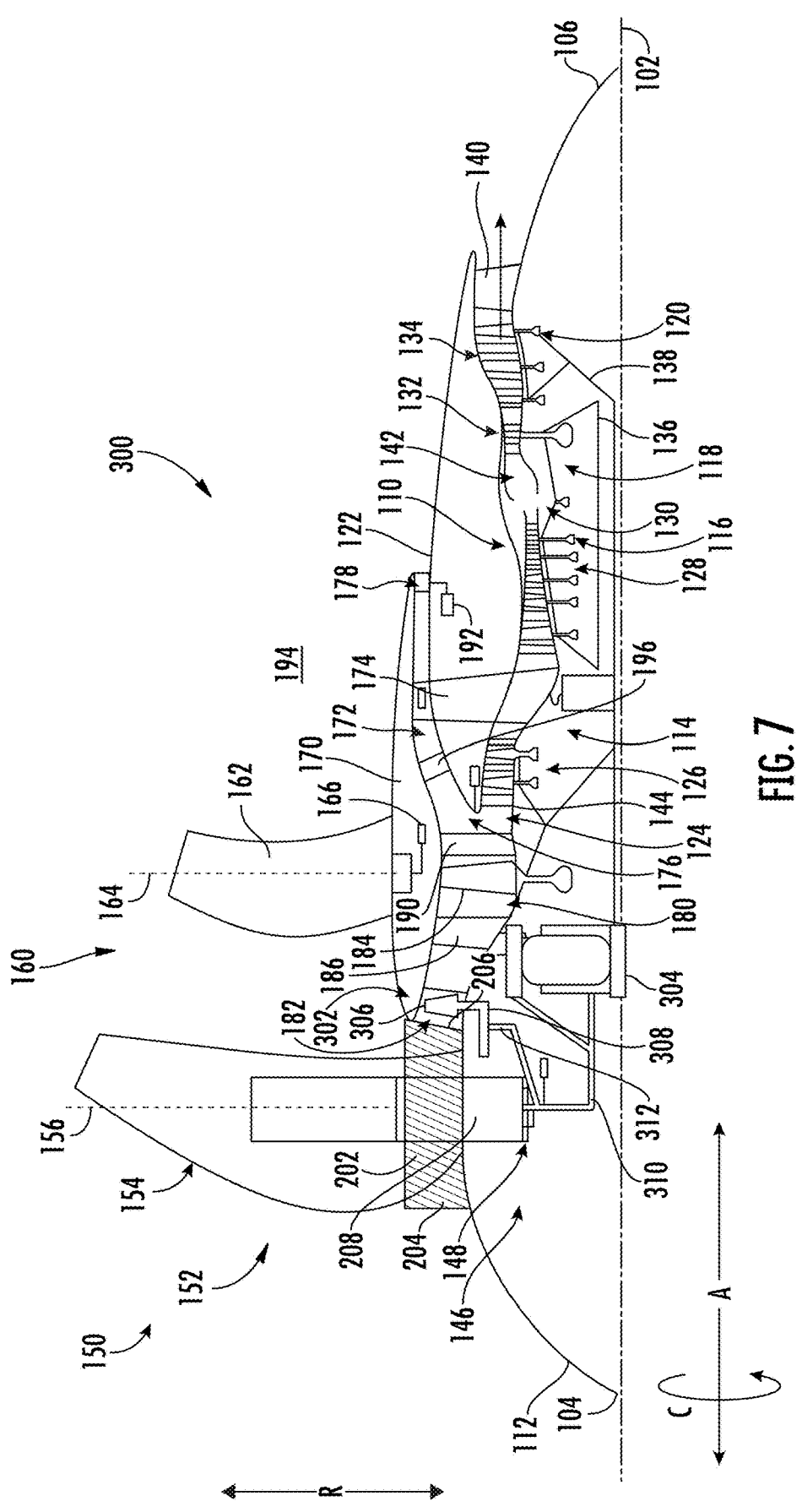
FIG. 7 is a schematic view of a gas turbine engine with an inlet frame and a booster.

With reference to FIG. 7, a schematic view of another gas turbine engine 300 is provided. The gas turbine engine 300 includes a primary fan 152, a spinner 112, an inlet frame 202 disposed between the primary fan 152 and the spinner 112, a booster 302 disposed between an engine inlet 182 and a ducted fan 184, and a gearbox 304 operably connected to the primary fan 152 and the booster 302. The booster 302 drives air into the engine inlet 182, past the inlet guide vanes 186, and to the ducted fan 184. The booster 302 includes a booster fan blade 306 and a booster shaft 308. The booster fan blade 306 directs air into the engine inlet 182 when rotated by the booster shaft 308, increasing air flow into the inlet duct 180. The booster 302 is disposed downstream of the inlet frame 202, further increasing air flow from the inlet frame 202 into the engine inlet 182.

The gearbox 304 is operably connected to the primary fan 152 by a fan shaft 310 and to the booster 302 by a second gearbox 312. In particular, the booster shaft 308 is operably connected to the second gearbox 312, and the second gearbox 312 is fixed to the fan shaft 310. In such a form, rotation of the fan shaft 310 by the gearbox 304 causes rotation of the second gearbox 312, which causes rotation of the booster shaft 308 and the booster fan blade 306. In such a form, the booster 302 and the primary fan 152 can rotate in different directions and at different rotation speeds, as determined by the gearing of the second gearbox 312. Rotating the booster fan blade 306 in a different direction and/or at a different rotation speed of the primary fan 152 improves air flow into the engine inlet 182 by forcing the booster fan blade 306 against the air flow from the inlet frame 202, capturing more air than the booster fan blade 306 would capture when rotating in a same direction as the primary fan 152. Alternatively, the gas turbine engine 300 may lack the second gearbox 312, and the booster shaft 308 may be directly fixed to the fan shaft 310, such that the booster fan blade 306 rotates in a same direction and at a same speed as the primary fan 152.

Figure 8:
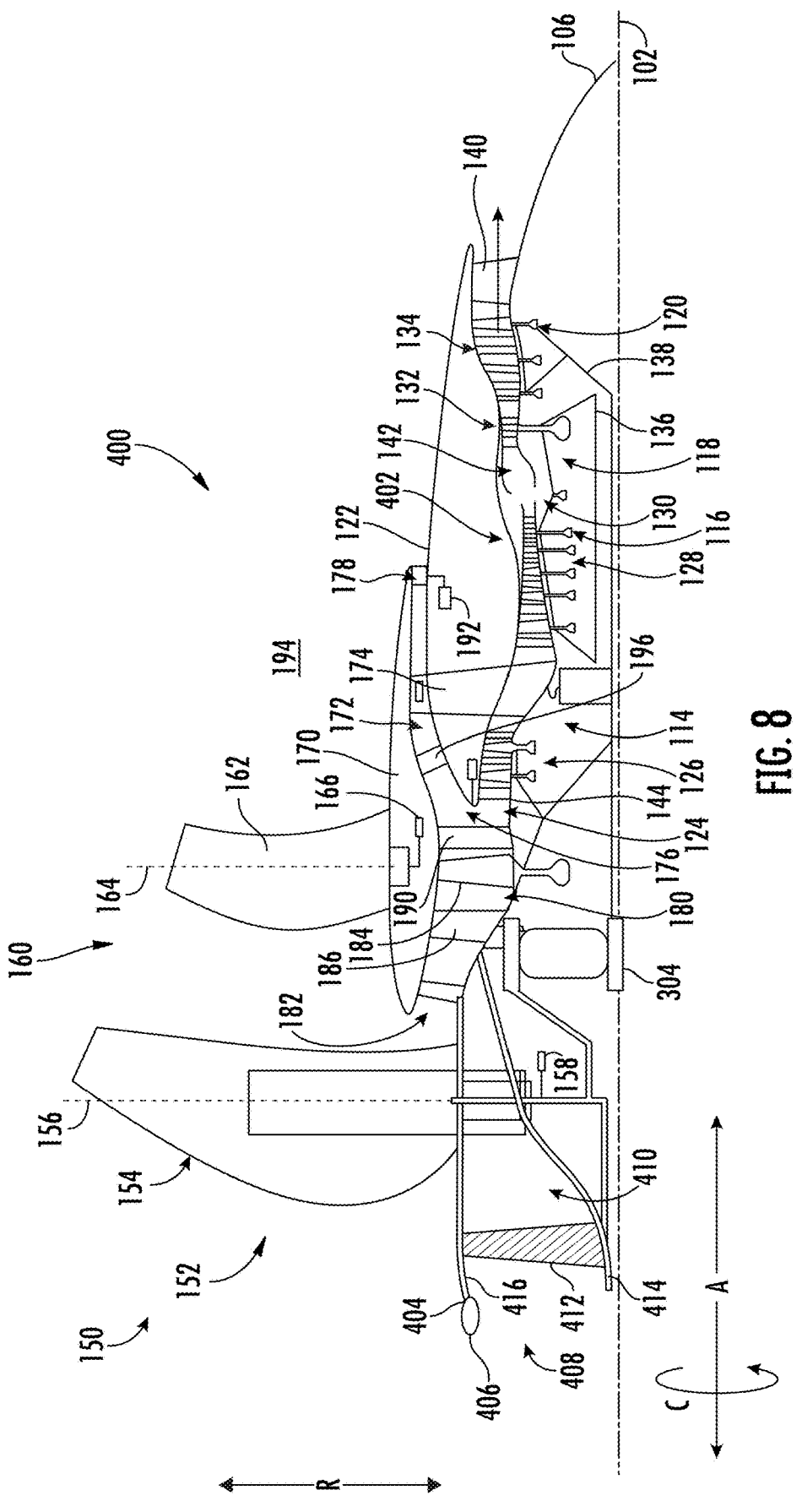
FIG. 8 is a schematic view of a gas turbine engine with a spinner inlet.

Now referring to FIG. 8, a schematic view of another gas turbine engine 400 is shown. The gas turbine engine 400 includes a turbomachine 402 defining a spinner 404, the spinner 404 defining a nose 406 and a spinner inlet 408 extending from the nose 406 into a spinner duct 410. The "nose" 406 of the spinner 404 is a forwardmost point of the turbomachine 402 in the axial direction A. The spinner duct 410 is fluidly connected to an inlet duct 180, directing air forward of the nose 406 into the inlet duct 180. Specifically, the spinner inlet 408 is upstream of a primary fan 152 and an engine inlet 182, and air that is upstream of the primary fan 152 and radially inward of the engine inlet 182 is captured by the spinner inlet 408 and directed through the spinner duct 410 to the inlet duct 180.

The spinner 404 includes a plurality of spinner struts 412 extending in the radial direction R in the spinner duct 410. The spinner struts 412 extend in the radial direction R from an inner portion 414 of the spinner duct 410 to an outer portion 416 of spinner duct 410, such that the spinner struts 412 extend an entire radial height of the spinner duct 410. The spinner struts 412 further direct air from the spinner inlet 408 through the spinner duct 410. The spinner struts 412 may have an airfoil shape (not shown) to provide swirl or other flow characteristics to the air that increase air flow into the inlet duct 180.

Figure 9:
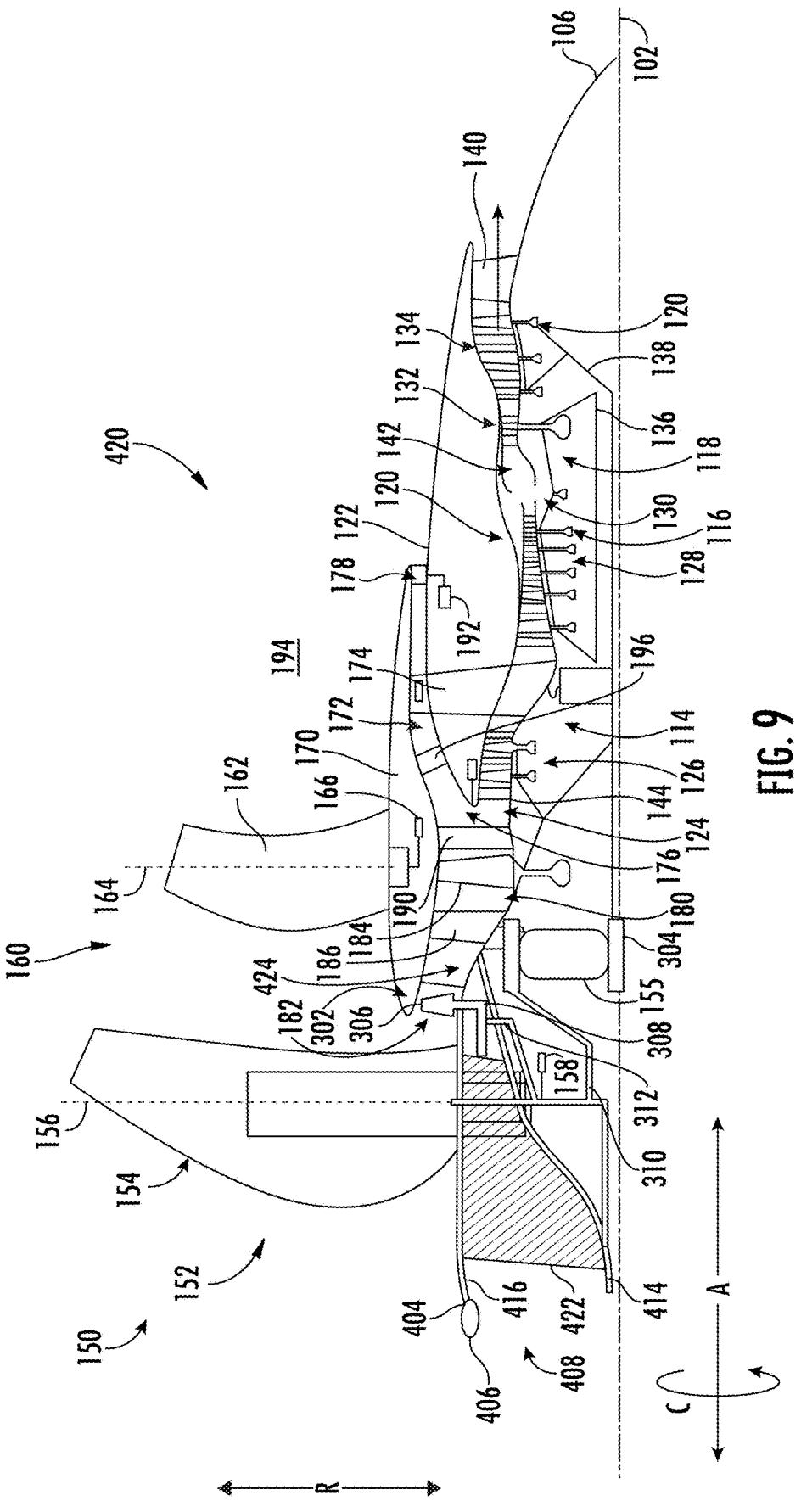
FIG. 9 is a schematic view of a gas turbine engine with a spinner inlet and a booster.

With reference to FIG. 9, a schematic view of another gas turbine engine 420 is provided. The gas turbine engine 420 includes a turbomachine 402 defining a spinner 404, the spinner 404 defining a nose 406 and a spinner inlet 408 extending from the nose 406 into a spinner duct 410. The spinner duct 410 includes a plurality of spinner struts 422 extending in the radial direction R. Specifically, the spinner struts 422 extend from the spinner inlet 408 to fan blades 154 of a primary fan 152. The spinner struts 422 extend through the spinner duct 410 past the fan blades 154 to direct air into the inlet duct 180 of the turbomachine 402. In such a form, the spinner struts 422 provide swirl or other flow characteristics to the air entering the inlet duct 180, improving air flow in the turbomachine 402.

The gas turbine engine 420 may include a booster 302, such as the booster 302 shown in FIG. 7 above. The booster 302 includes a booster fan blade 306 and a booster shaft 308. A second gearbox 312 connects the booster shaft 308 to a fan shaft 310, which is operably connected to a gearbox 304. The booster 302 is disposed in the inlet duct 180 between an engine inlet 182 and a ducted fan 184. In particular, the spinner duct 410 and the inlet duct 180 meet at a junction 424, and the booster 302 is upstream of the junction 424. The booster 302 provides additional air flow into the engine inlet 182. The booster 302 may rotate at a different rotation speed and/or a different rotation direction as the primary fan 152, based on the specific gearing of the second gearbox 312.

Figure 10:
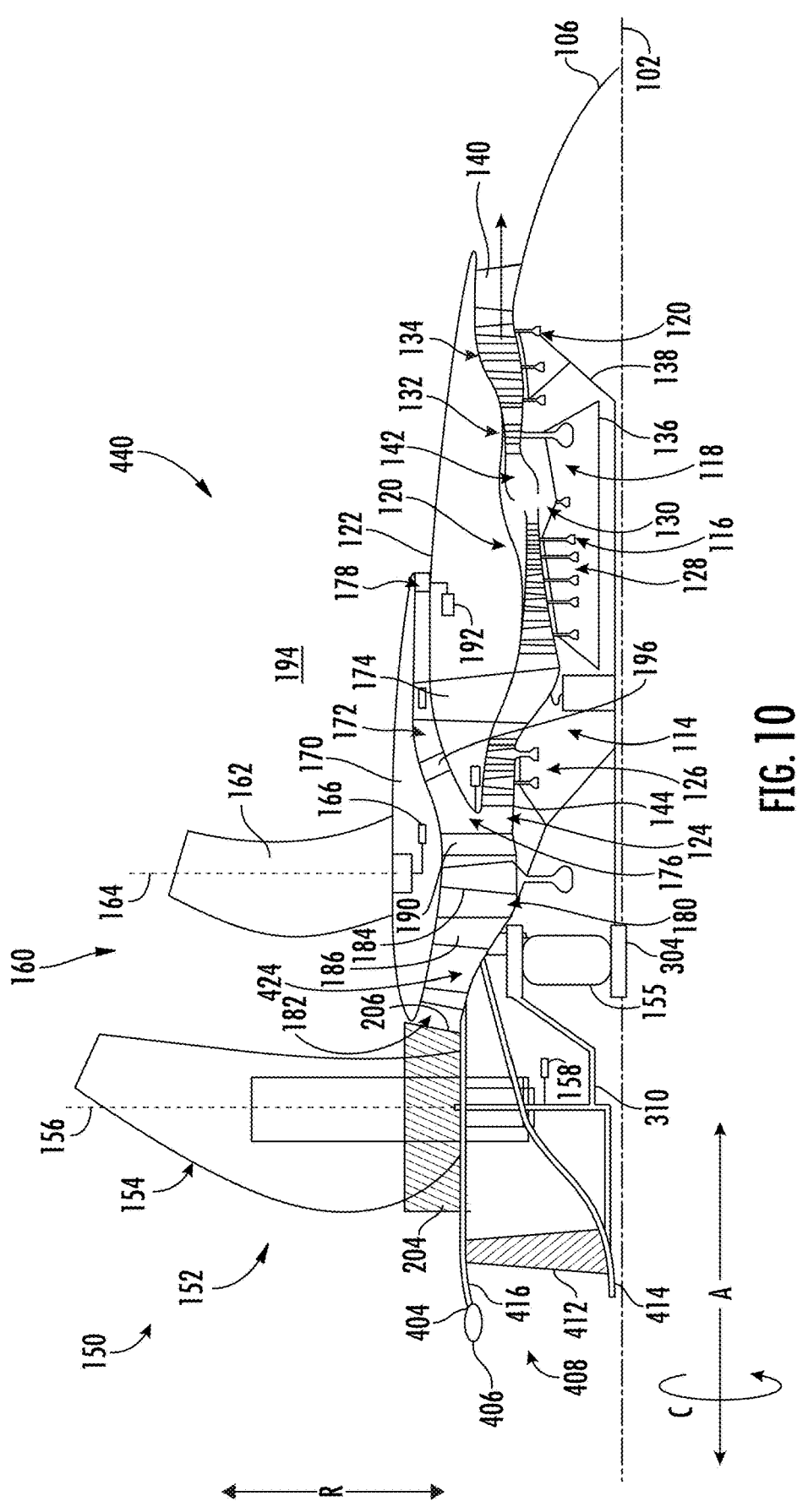
FIG. 10 is a schematic view of a gas turbine engine with a spinner inlet and an inlet frame.

Now referring to FIG. 10, a schematic view of another gas turbine engine 440 is provided. The gas turbine engine 440 includes a turbomachine 402 defining a spinner 404, as described above and shown in FIGS. 8-9, and an inlet frame 202. The inlet frame 202 is disposed outward in the radial direction R from the spinner duct 410 and directs air into the engine inlet 182. In such a form, air is provided to the inlet duct 180 by both the inlet frame 202 and the spinner inlet 408. As described above, the inlet frame 202 includes a plurality of struts 208 (FIG. 4) that have an airfoil shape to direct air into the engine inlet 182. It will be appreciated that other combinations of components from FIGS. 1-10, such as boosters, struts, and the like, may be included in the gas turbine engine.

Figure 11:
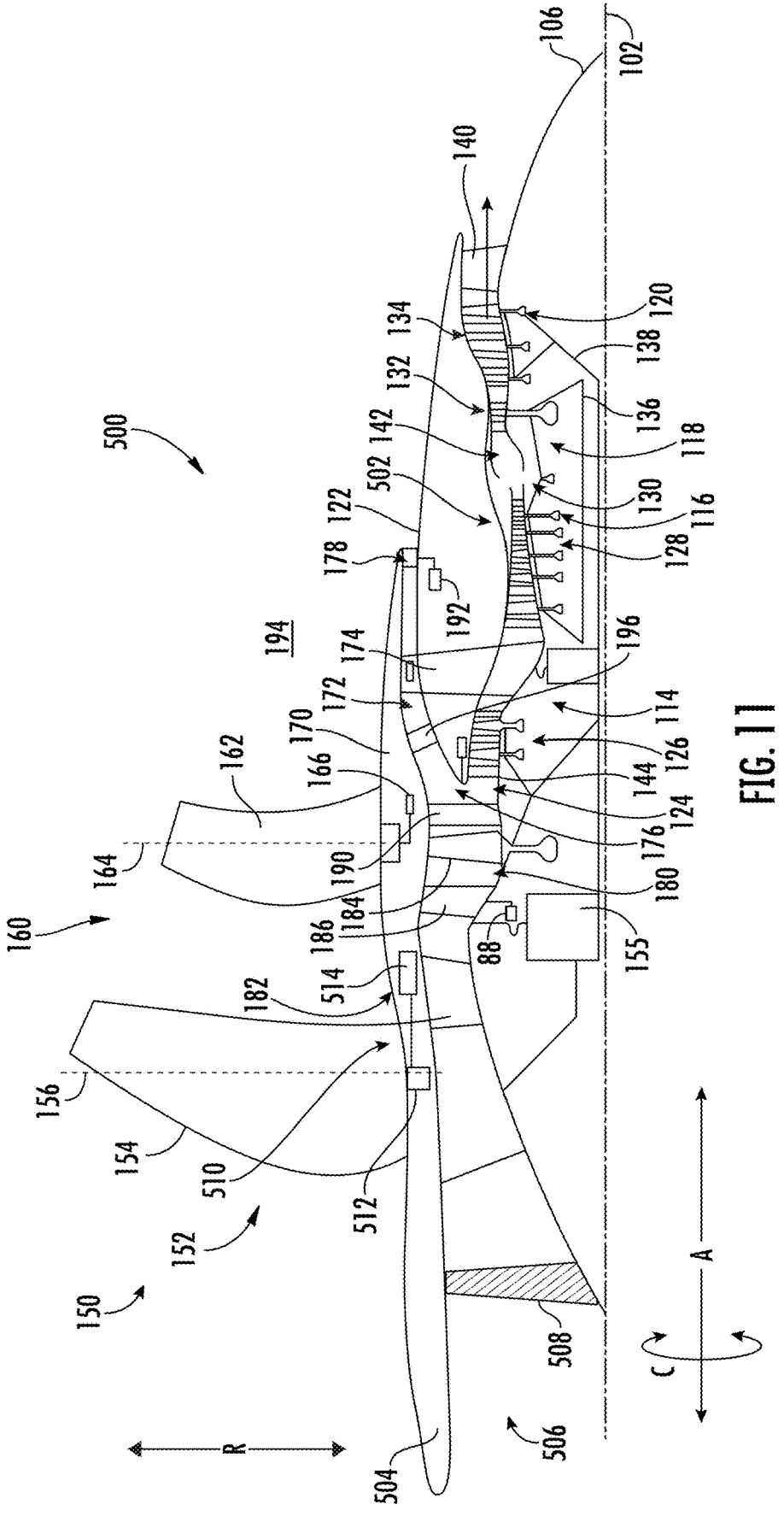
FIG. 11 is a schematic view of a gas turbine engine with a spinner inlet and a fan pitch actuation system.

With reference to FIG. 11, a schematic view of another gas turbine engine 500 is provided. The gas turbine engine 500 includes a turbomachine 502 defining a spinner 504 and a spinner duct 506 that extends to an engine inlet 182. In such a form, the turbomachine 502 lacks an engine inlet and an inlet frame, such as those described in FIGS. 1-10. The spinner duct 506 includes a spinner strut 508 that further directs and swirls air into the engine inlet 182.

The gas turbine engine includes a fan pitch actuation system (FPAS) 510. The FPAS 510 rotates the fan blades

154 of the primary fan 152 to specified pitch angles. The FPAS 510 includes a trunnion 512 and an actuator 514 rotatably connected to the trunnion 512. Because the spinner duct 506 extends into portions of the spinner 504 that conventionally house the FPAS 510, the components of the FPAS 510 are disposed in the remaining regions of the spinner 504. Specifically, the actuator 514 is disposed outward of the spinner duct 506 in the radial direction R and aft of the primary fan 152 in the axial direction A, and the trunnion 512 is disposed outward of the spinner duct 506 in the radial direction R. In such a form, the FPAS 510 is arranged to control the pitch angles of the fan blades 154 of the primary fan 152

Figure 12B:
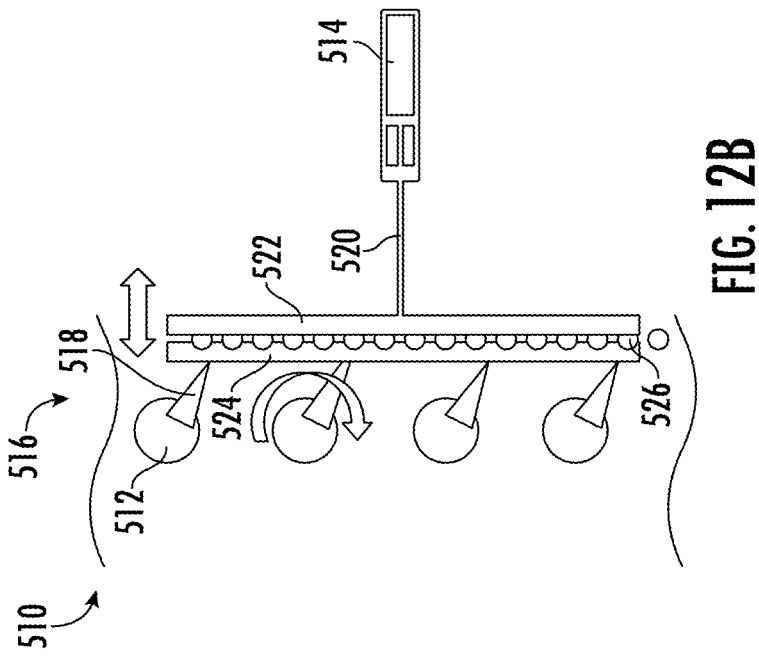
FIG. 12B is a partial top-down view of the fan pitch actuation system of FIG. 11.
Figure 12A:
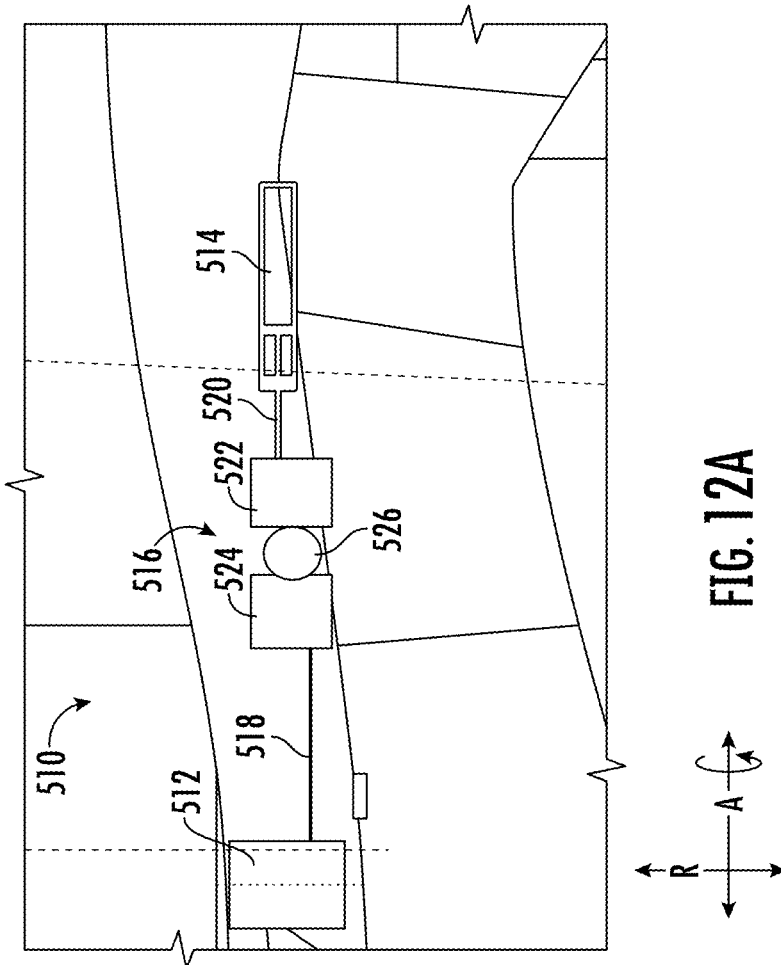
FIG. 12A is a magnified side cross-sectional view of the fan pitch actuation system of FIG. 11.

Now referring to FIGS. 12A-12B, magnified views of the FPAS 510 of FIG. 11 are provided. FIG. 12A is a magnified, side view of the FPAS 510. FIG. 12B is a magnified, top-down view of the FPAS 510.

The FPAS 510 includes a trunnion 512, an actuator 514, a swash plate 516, and a plurality of pitch links 518. The actuator 514 includes a shaft 520 connected to the swash plate 516, and each of the plurality of pitch links 518 extends from the swash plate 516 to the respective trunnion 512 connected each of the fan blades 154. The swash plate 516 includes a stator 522 connected to the shaft 520 of the actuator 514, a rotor 524 connected to the pitch links 518, and a plurality of bearings 526 engaging the stator 522 and the rotor 524. The swash plate 516 extends in the circumferential direction C around the turbomachine 502, engaging each of the plurality of fan blades 154.

The actuator 514 extends and contracts the shaft 520, which pushes a portion of the stator 522 toward some of the fan blades 154 and pulls a portion of the stator 522 away from others of the fan blades 154. The stator 522 engages the bearings 526, which urge a portion of the rotor 524 toward the fan blades 154 and a portion of the rotor 524 away from others of the fan blades 154. The rotor 524 moves the pitch links 518, which rotate the trunnions 512 of each of the fan blades 154. The rotation of the trunnions 512 changes a respective pitch angle for each of the fan blades 154. In particular, the pitch links 518 are arranged such that movement of the rotor 524 by the stator 522 moves the trunnions 512 such that each of the fan blades 154 is at a same pitch angle. The position of the shaft 520 relative to the actuator 514 thus corresponds to a specific pitch angle for each of the fan blades 154, and the FPAS 510 can thus control the shaft 520 with the actuator 514 to move the fan blades 154 to a specified pitch angle.

By incorporating one or more components to increase air flow into a core duct of the turbomachine, inlet losses that occur due to the large size of a spinner of the turbomachine may be reduced or eliminated. In particular, a rotating inlet frame with fan-shaped struts can direct air flowing across the spinner into an engine inlet, increasing flow into the core duct. Additionally, a spinner inlet defined in the spinner itself can further increase air flow that would otherwise flow into a bypass passage. An additional booster can further increase air flow into the core duct. With the inlet frame, the booster, and spinner inlet, other components are rearranged within the turbomachine, such as a fan pitch actuation system, to control other components while maintaining the increased air flow. Such arrangements may be specified to meet specific flow rate increases into the engine inlet and/or the core duct to improve operation of the engine.

Further aspects are provided by the subject matter of the following clauses:

A gas turbine engine defining an axial direction and a radial direction, the gas turbine engine including a spinner defining a spinner duct and a spinner inlet to the spinner duct, a turbomachine including a compressor section, a combustion section, and a turbine section arranged in serial flow order, the turbomachine defining a fan duct, a fan duct inlet to the fan duct, a core duct, and a core inlet to the core duct, and a primary fan driven by the turbomachine, wherein the spinner inlet is upstream of the primary fan.

The gas turbine engine of any of the preceding clauses, wherein the turbomachine further defines an engine inlet to an inlet duct, wherein the engine inlet is downstream of the primary fan.

The gas turbine engine of any of the preceding clauses, wherein the spinner duct is fluidly connected to the inlet duct.

The gas turbine engine of any of the preceding clauses, wherein the spinner duct is fluidly connected to the fan duct inlet and the core inlet.

The gas turbine engine of any of the preceding clauses, wherein the spinner defines a nose, the nose being a forwardmost point of the turbomachine in the axial direction, wherein the spinner inlet extends from the nose.

The gas turbine engine of any of the preceding clauses, further including a plurality of spinner struts extending in the radial direction in the spinner duct.

The gas turbine engine of any of the preceding clauses, wherein each of the plurality of spinner struts has an airfoil shape positioned to direct air into the spinner duct.

The gas turbine engine of any of the preceding clauses, further including a fan pitch actuation system including a trunnion and an actuator rotatably connected to the trunnion, wherein the actuator is disposed aft of the primary fan in the axial direction, and wherein the trunnion is disposed outward of the spinner duct in the radial direction.

The gas turbine engine of any of the preceding clauses, further including a swash plate and a pitch link extending from the swash plate to the trunnion.

The gas turbine engine of any of the preceding clauses, wherein the swash plate includes a stator connected to the actuator, a rotor connected to the trunnion, and a plurality of bearings engaging the stator and the rotor.

A gas turbine engine defining an axial direction and a radial direction, the gas turbine engine including a spinner defining a spinner duct and a spinner inlet to the spinner duct, a turbomachine including a compressor section, a combustion section, and a turbine section arranged in serial flow order, the turbomachine defining a fan duct, a fan duct inlet to the fan duct, a core duct, and a core inlet to the core duct, a primary fan driven by the turbomachine, and an inlet frame disposed between the spinner and the primary fan, wherein the inlet frame is disposed upstream of the inlet duct and extends to the engine inlet.

The gas turbine engine of any of the preceding clauses, wherein the inlet frame further includes a plurality of struts extending from the spinner to the primary fan, wherein the plurality of struts are disposed upstream of the engine inlet.

The gas turbine engine of any of the preceding clauses, wherein each of the plurality of struts has an airfoil shape positioned to direct air into the engine inlet.

The gas turbine engine of any of the preceding clauses, wherein the primary fan includes a plurality of fan blades, wherein each of the plurality of struts extends from the spinner to one of the plurality of fan blades.

The gas turbine engine of any of the preceding clauses, wherein the plurality of struts include a plurality of first struts each having a first shape and a plurality of second struts each having a second shape, wherein the first shape is different than the second shape.

The gas turbine engine of any of the preceding clauses, further including a plurality of trunnions disposed in the spinner, wherein the primary fan includes a plurality of fan blades, and wherein each of the plurality of trunnions extends from the spinner through one of the plurality of first struts to one of the plurality of fan blades.

The gas turbine engine of any of the preceding clauses, wherein each of the plurality of second struts is disposed between an adjacent two of the plurality of first struts.

The gas turbine engine of any of the preceding clauses, further including a booster disposed in the inlet duct downstream of the inlet frame.

The gas turbine engine of any of the preceding clauses, wherein the turbomachine defines a spinner inlet into a spinner duct, wherein the inlet frame is disposed outward in the radial direction from the spinner duct.

The gas turbine engine of any of the preceding clauses, further including a fan pitch actuation system including a trunnion and an actuator rotatably connected to the trunnion, wherein the actuator is disposed aft of the primary fan in the axial direction, and wherein the trunnion is disposed outward of the spinner duct in the radial direction.

A gas turbine engine defining an axial direction and a radial direction, the gas turbine engine including a turbomachine including a compressor section, a combustion section, and a turbine section arranged in serial flow order, the turbomachine defining an engine inlet, a fan duct, a fan duct inlet to the fan duct, a core duct, and a core inlet to the core duct, a primary fan driven by the turbomachine, and an inlet frame disposed beneath the primary fan, wherein the inlet frame is disposed upstream of the inlet duct and extends to the engine inlet.

A gas turbine engine defining an axial direction and a radial direction, the gas turbine engine including a turbomachine including a compressor section, a combustion section, and a turbine section arranged in serial flow order, the turbomachine defining a fan duct, a fan duct inlet to the fan duct, a core duct, and a core inlet to the core duct, a primary fan driven by the turbomachine, an inlet frame disposed beneath the primary fan, and a booster disposed in the engine inlet, wherein the inlet frame is disposed upstream of the inlet duct and extends to the engine inlet.

A gas turbine engine defining an axial direction and a radial direction, the gas turbine engine including a turbomachine including a compressor section, a combustion section, and a turbine section arranged in serial flow order, a primary fan driven by the turbomachine, and an inlet frame disposed beneath the primary fan, wherein the inlet frame is disposed upstream of the inlet duct and extends to an engine inlet.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine defining an axial direction and a radial direction, the gas turbine engine comprising:
    a spinner defining a spinner duct and a spinner inlet to the spinner duct;

a plurality of spinner struts extending in the radial direction in the spinner duct;

a turbomachine comprising a compressor section, a combustion section, and a turbine section arranged in serial flow order, the turbomachine defining a fan duct, a fan duct inlet to the fan duct, a core duct, and a core inlet to the core duct; and a primary fan driven by the turbomachine, wherein the spinner inlet is upstream of the primary fan.

2. The gas turbine engine of claim 1, wherein the turbomachine further defines an engine inlet to an inlet duct, wherein the engine inlet is downstream of the primary fan.

3. The gas turbine engine of claim 2, wherein the spinner duct is fluidly connected to the inlet duct.

4. The gas turbine engine of claim 1, wherein the spinner duct is fluidly connected to the fan duct inlet and the core inlet.

5. The gas turbine engine of claim 1, wherein the spinner defines a nose, the nose being a forwardmost point of the turbomachine in the axial direction, wherein the spinner inlet extends from the nose.

6. The gas turbine engine of claim 1, wherein each of the plurality of spinner struts has an airfoil shape positioned to direct air into the spinner duct.

7. The gas turbine engine of claim 1, further comprising a fan pitch actuation system including a trunnion and an actuator rotatably connected to the trunnion, wherein the actuator is disposed aft of the primary fan in the axial direction, and wherein the trunnion is disposed outward of the spinner duct in the radial direction.

* * * * *